Patented Aug. 7, 1951

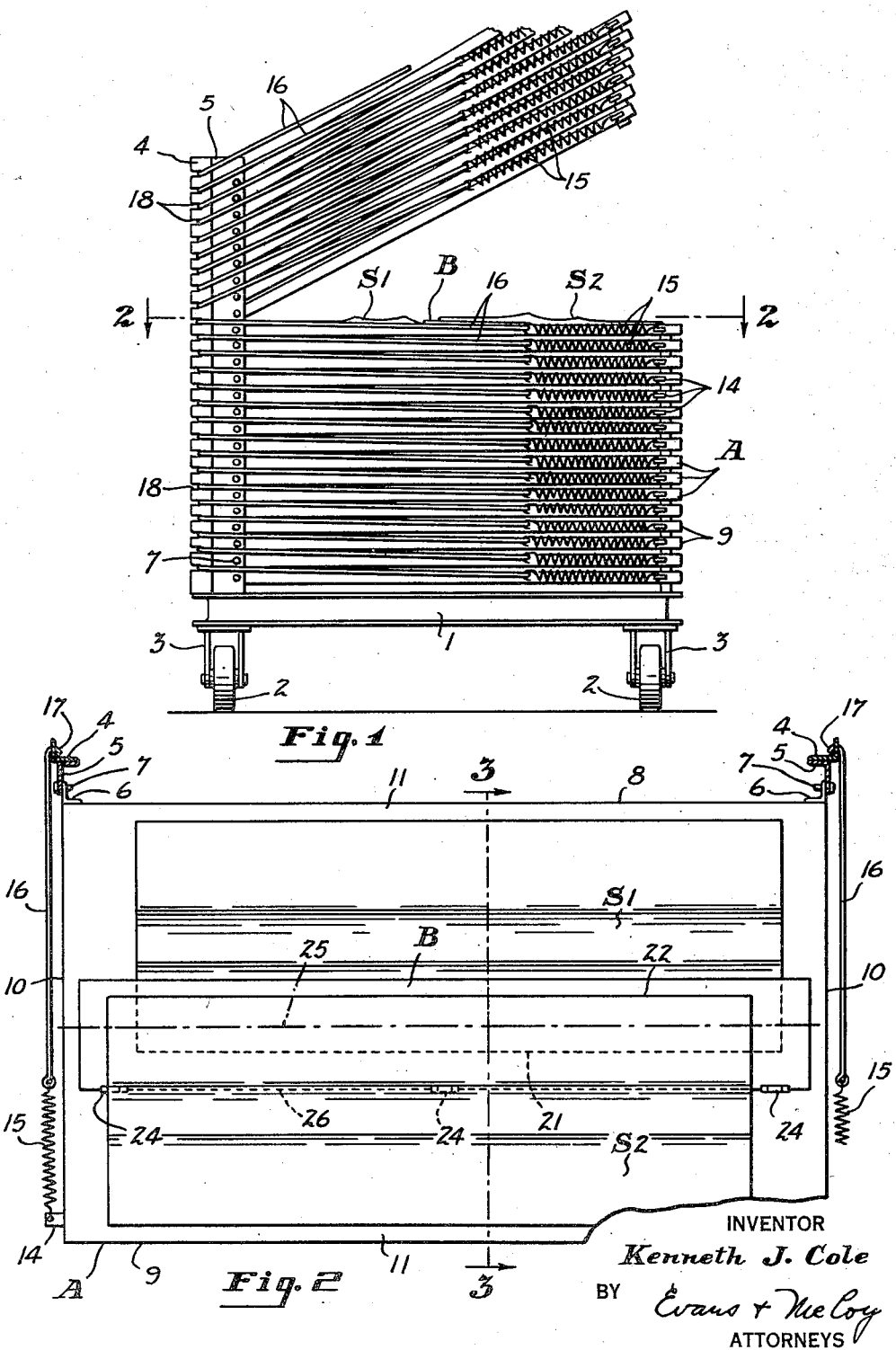

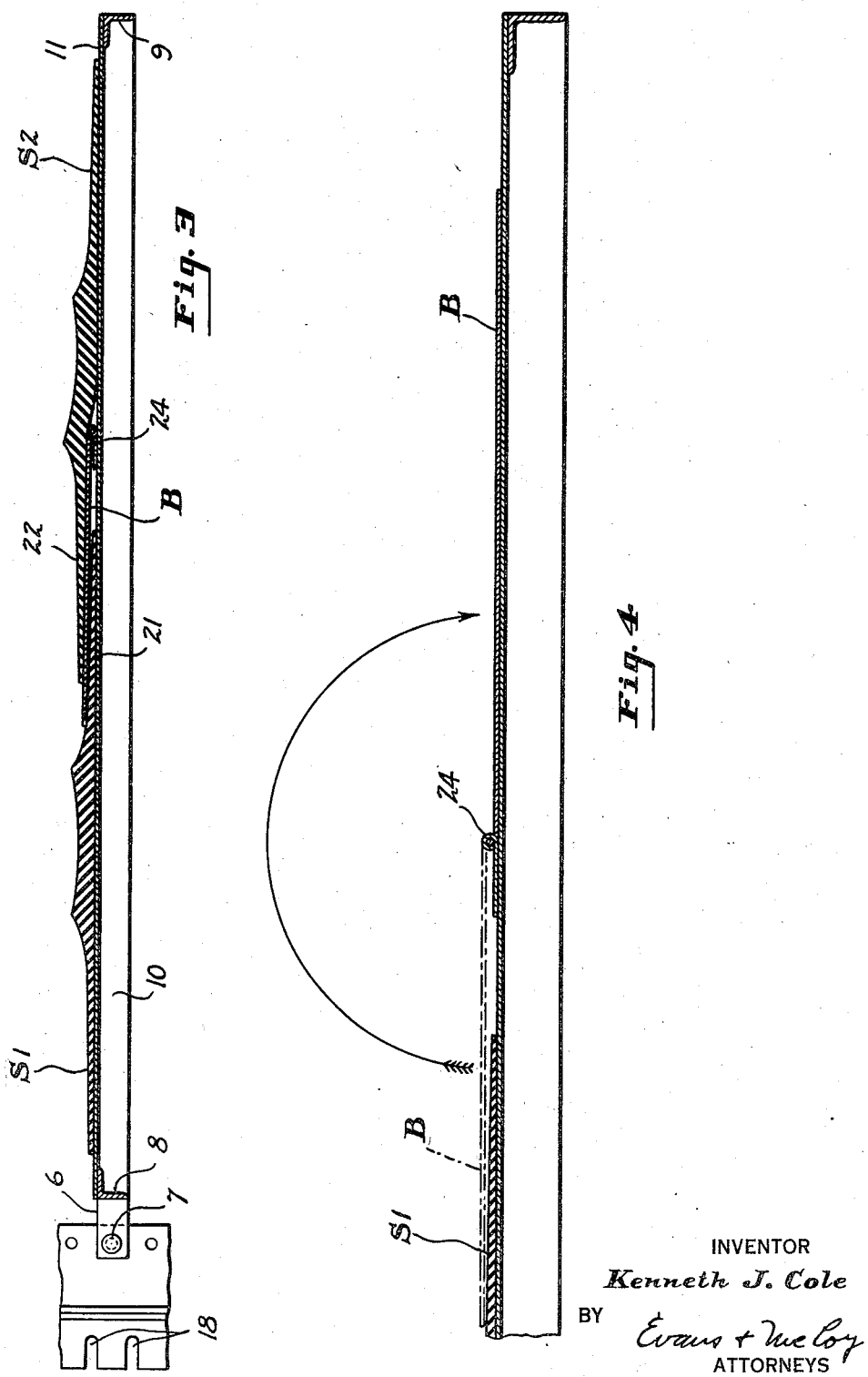

2,563,212

UNITED STATES PATENT OFFICE 2,563,212

HINGED SEPARATOR FOR STOCK TRAYS

Kenneth J. Cole, Cuyahoga Falls, Ohio, assignor to The General Tire and Rubber Company, Akron, Ohio, a corporation of Ohio Application May 25, 1948, Serial No. 29,141

3 Claims. (Cl. 211—150)

This invention relates to material handling apparatus and more particularly to stock trays of the type used on trucks for storing and transporting relatively wide strips of uncured or partially cured rubber in the manufacture of vehicle tires. The invention is, however, applicable to other types of material handling equipment in which it is desired to dispose a number of pieces or strips of relatively wide stock in proximity to but separated from one another.

It is an object of the invention to provide a generally improved stock tray incorporating separating means which permit a plurality of strips of adhesive or tacky stock to be disposed on the tray in overlapped relation with respect to one another but not in contact.

Another object is to provide a stock tray having a relatively rigid separator movably mounted so that in loading and unloading the tray the separator can be readily shifted into and out of separating position. More specifically, the invention contemplates a separator in the form of a pivoted leaf which is swung into and out of overlapping relation with respect to a strip of rubber or other tacky stock disposed on the tray.

Other objects and advantages will become apparent as the description proceeds and relate to details of construction and arrangements of parts for obtaining a simple and inexpensive separator design that can be readily manufactured and installed. The description is made in connection with the accompanying drawings forming a part of the specification. Like parts throughout the several views are indicated by the same letters and numerals of reference. In the drawings:

Figure 1 is an end elevational view of a stock truck having trays and separators constructed in accordance with the present invention, a number of the upper trays being shown raised for access to stock carried by one of the trays, portions of some of the raised trays being broken away and removed;

Fig. 2 is a plan view with parts broken away and removed taken substantially on the line indicated at 2—2 of Fig. 1 to show the arrangement of the rubber stock strips and the separator on a tray;

Fig. 3 is a sectional detail taken substantially on the line indicated at 3—3 of Fig. 2 and enlarged with respect to that figure to show the overlapped raw rubber strips separated by the movable leaf; and Fig. 4 is a fragmentary sectional detail corresponding to Fig. 3 and enlarged with respect to that figure, showing one of the strips of rubber stock removed and the separator in initial position.

In the handling of stock in a rubber manufacturing plant it is customary to compound and partially process rubber materials in one department and assemble, shape, and cure in other departments. The transportation of partially cured and formed rubber stock from one department to another presents an awkward problem in that the rubber, by reason of its uncured or partially cured condition, is in a sticky or tacky condition. Unless kept separated from one another the pieces, sheets, and strips of rubber tend to stick or adhere together. Partially formed rubber stock such as the strips used in forming the tread, shoulder, and side walls of the vehicle tires, are desirably supported uniformly along their lengths and across their widths so that distortion and growth is avoided and the characteristic shape to which it is formed is not lost in transit and storage. Wheeled trucks carrying a multiplicity of superposed trays are used to handle rubber stock such as the tread strips referred to. Such a truck comprises a generally rectangular frame I formed as by welding together suitable side and end members of steel or other metal. The truck is supported on a number of wheels 2 mounted in metal brackets 3 which may be welded to the underside of the frame I as at the corners of the latter. Two or more of the wheels may be castered so that the truck can be steered. A pair of T section uprights are secured to the truck at the opposite ends of one side. These uprights are each formed of a pair of metal angle section members 4 and 5, one flange of each member being disposed flatwise against a flange of the other.

A number of trays A are disposed on the truck one above another, one side of each tray having projecting ears 6 pivoted at 7 to the angle members 5 of the uprights. The trays are formed of metal angle section side members 8 and 9 and end members 10 welded or otherwise secured together at the corners of the trays. A sheet metal apron 11 of rectangular plan form is marginally welded to the side and end members of each tray.

Ears 14 projecting from the ends of the trays and spaced from the pivots 7 are connected by tensioned springs 15 and rods 16 to the angle members 4 of the truck uprights. The ends of the rods 16 are formed with angularly disposed hook portions 17 received in open notches 18 in the flanges of the uprights 4. The tray pivots 7 are located between the rod receiving notches 18 and the ears 14 to which the springs 15 are connected so that when the trays A are raised or tilted upwardly as shown in Fig. 1, the tension in the springs 15 causes them to contract and the forces in the rods 16 and the springs hold the trays balanced in the elevated positions to which they are moved. This counterbalancing effect of the force couples provided by the springs thus supports the trays A in cantilever fashion. Desirably the notches 18 are above the level of the corresponding pivots 7 so that a slight lifting force or couple is exerted on each of the trays even when the latter are in their lowered or horizontal positions. By this spring loaded, counterbalanced arrangement the operator can readily lift the trays to raised positions after removal therefrom of the rubber stock.

Each tray is used to carry a plurality of stock strips indicated in the drawings at S—1 and S—2, the stock being centrally thickened in cross section and used in the manufacture of pneumatic vehicle tires. The adjacent relatively thin edges 21 and 22, respectively, of the stock strips are overlapped and separated from one another by a shiftable leaf or panel B formed of a relatively stiff, rigid, or shape retaining material such as composition board, plywood, or sheet metal. The separator is fastened along one longitudinal edge to the tray apron 11 by hinges 24 which permit the leaf to be swung back and forth to overlie different portions of the apron 11 as indicated by the broken and solid lines of Fig. 4.

In loading each of the trays A the separator leaf B is swung or shifted to the full line position illustrated in Fig. 4 and the stock strip S—1 is placed on the tray apron 11 between hinge line 26 and that side of the tray which is pivoted to the uprights 5. In constructions employing a single separator leaf, as illustrated, the leaf is located with the line 26 of the hinges 24 off-center or spaced away from the hinged side of the tray a distance greater than half the tray width. Swinging or moving the separator leaf from the full line position of Fig. 4 in which it lies wholly on one or the outside of tray center line 25, to the full line position shown in Fig. 3, in which it overlies the marginal side portion 21 of the strip S—1, shifts the leaf separator to a central position along the length of the tray, approximately midway between the side members 8 and 9 of the latter. The strip S—2 is then placed on the outer portion of the tray apron 11, the edge portion 22 of the strip resting upon the leaf B and being separated thereby from the edge portion 21 of the strip S—1. Only the relatively thin edge portions of the stock strips are overlapped, the leaf separators not extending over the thick central portions of the stock and being disposed between the thin edges only of the stock.

In unloading the truck trays the procedure is reversed; from each tray the strip S—2 is first removed, the leaf B is shifted or pivoted away from the side portion 21 of the strip S—1, and the latter is then lifted from the tray.

The pivoted separator leaves of the present invention permit the storage and transportation of a plurality of strips or lengths of tacky, uncured rubber stock on the individual trays of a stock truck. The stiffness or rigidity of the leaves permits them to be easily pivoted or swung back and forth manually between initial open positions for receiving the strips S—1 and secondary or overlying positions for receiving the strips S—2. Thus loading and unloading of the stock truck is expedited and considerable time saving is effected over the procedure required in using cloth and other flexible separators.

In accordance with the patent statutes the principles of the present invention may be utilized in various ways, numerous modifications and alterations being contemplated, substitution of parts and changes in construction being resorted to as desired, it being understood that the embodiment shown in the drawings and described above is given merely for purposes of explanation and illustration without intending to limit the scope of the claims to the specific details disclosed.

What I claim and desire to secure by Letters Patent of the United States is:

1. In a stock truck of the type having a supporting structure and a plurality of superposed elongated trays mounted thereon and movable relative to one another in loading and unloading the truck, a separator on each tray comprising a substantially rigid leaf of greater length than width, each of said leaves being hinged along one side edge to the tray for swinging movement about an axis parallel to the long axis of such tray, and the hinge axis of each separator leaf being disposed so that in one position the separator leaf is disposed wholly on one side of the longitudinal center line of the tray and in another position the leaf overlies such longitudinal center line of the tray.

2. In a stock truck of the character described, an elongated tray for receiving strip stock, and a separator comprising a substantially rigid leaf of greater length than width, said leaf being hinged to the tray for swinging movement about an axis substantially parallel to the long axis of the tray, and the hinge axis of the separator leaf being disposed so that in one position the separator leaf is disposed wholly on one side of the longitudinal center line of the tray and in another position the leaf overlies such longitudinal center line of the tray.

3. In a stock truck of the type having a supporting structure and a plurality of superposed elongated trays mounted thereon and movable relative to one another in loading and unloading the truck, a separator on each tray comprising a substantially rigid leaf of greater length than width, each of said leaves being hinged to the tray for swinging movement about an axis parallel to the long axis of such tray and also parallel to the long axis of the separator, and the hinge axis of each separator leaf being disposed so that in one position the separator leaf is disposed wholly on one side of the longitudinal center line of the tray and in another position the leaf overlies such longitudinal center line of the tray.

KENNETH J. COLE.

REFERENCES CITED

The following references are of record in the file of this patent:

UNITED STATES PATENTS

| Number | Name | Date |
|---|---|---|
| 1,049,726 | Johnson | Jan. 7, 1913 |
| 1,119,925 | Chatham | Dec. 8, 1914 |
| 1,597,631 | Spindel | Aug. 21, 1926 |
| 1,666,074 | Steinhilber | Apr. 17, 1928 |

FOREIGN PATENTS

| Number | Country | Date |
|---|---|---|
| 299,129 | Great Britain | Oct. 25, 1928 |